United States Patent [19]
Tabe

[11] Patent Number: 5,286,059
[45] Date of Patent: Feb. 15, 1994

[54] HEIGHT CONTROL SYSTEM WHEN VEHICLE IS JACKED UP

[75] Inventor: Masahiko Tabe, Kanagawa, Japan

[73] Assignee: Nissan Motor Co., Ltd., Yokohama, Japan

[21] Appl. No.: 884,688

[22] Filed: May 18, 1992

[30] Foreign Application Priority Data

May 24, 1991 [JP] Japan .................. 3-120103

[51] Int. Cl.⁵ .............. B60G 21/06; B60G 17/00
[52] U.S. Cl. ................... 280/840; 280/707
[58] Field of Search ........... 280/707, 6.12, 840; 180/41

[56] References Cited

U.S. PATENT DOCUMENTS

| | | | |
|---|---|---|---|
| 4,377,293 | 3/1983 | Senoo | 280/840 |
| 4,669,750 | 6/1987 | Tanaka | 280/707 |
| 4,829,436 | 5/1989 | Kowalik | 280/840 |
| 4,965,878 | 10/1990 | Yamagiwa | 180/41 |
| 5,100,167 | 3/1992 | Kamimura | 280/707 |

FOREIGN PATENT DOCUMENTS 58-95307 6/1983 Japan .

Primary Examiner—Karin L. Tyson
Attorney, Agent, or Firm—Lowe, Price, LeBlanc & Becker

[57] ABSTRACT

A vehicle height control system is provided which serves to adjust fluid pressures in actuators disposed between a vehicle body and suspension members supporting wheels respectively for leveling the vehicle body at a standard height. The height control system is operable to deactivate height level control when a vehicle is raised above a standard height level, with a jack for example, during parking for preventing a bottom of the vehicle body from contacting with any protrusions of a road surface by being subsequently jacked down with an extremely decreased height level.

3 Claims, 4 Drawing Sheets

HEIGHT CONTROL SYSTEM WHEN VEHICLE IS JACKED UP

BACKGROUND OF THE INVENTION

1. Field of The Invention

The present invention relates generally to a height control system for a vehicle. More particularly, the invention is directed to deactivate height control when a vehicle body is lifted up with a jack, for example, during parking.

2. Description of The Background Art

Japanese Utility Model Publication No. 58-95307 discloses a height control system for a vehicle utilizing electronically controlled air suspension. The air suspension system includes air chambers filled with compressed air and shock absorbers for adjusting height levels between a vehicle body and wheels respectively. The height level adjustment is accomplished by supplying compressed air from an air source to the air chambers through height control valves or draining the compressed air in the air chambers for leveling the vehicle body at a standard height value.

However, in such a conventional height control system, when a vehicle body is lifted up by external means, for example, with a garage jack, the suspension system concludes that the vehicle body is higher than a standard height value due to variation in vehicular load and then drains the compressed air from air chambers completely to attempt leveling the vehicle body to the standard height value. When the vehicle is jacked down, a vehicle height extremely lower than the standard height value results. Thus, when the vehicle body is jacked down with the lowered vehicle height, a bottom of the vehicle body may actually contact the road surface. Therefore, a vehicle height control system which allows for variation in vehicle height caused by external means has been sought.

SUMMARY OF THE INVENTION

It is therefore a principal object of the present invention to avoid the disadvantages of the prior art.

It is another object of the invention to provide a height control system for a vehicle which distinguishes variation in vehicle height due to external force.

According to one aspect of the present invention, there is provided a height control system for a vehicle which comprises suspension units including actuators for adjusting height levels between a vehicle body and wheels respectively, height sensor means for detecting a height level of the vehicle body at at least one of the wheels to provide a signal indicative thereof, a vehicle parking state determining means for determining a vehicle parking state to provide a signal indicative thereof, and height control means responsive to the signal from the height sensor means indicating a height level shifted from a preselected standard height value to provide leveling control signals to the actuators so that the vehicle body is leveled at the preselected standard height value, the height control means being further responsive to the signal from the height sensor means indicating the height level above a preselected threshold value greater than the standard height value and the signal from the vehicle parking state determining means to deactivate leveling control.

In the preferred mode, the height control means reactivates the leveling control when the height level detected by the height sensor means becomes smaller than a given value which is smaller than the preselected threshold value. Additionally, the height sensor means detects the height level of the vehicle body at a wheel arranged at a longitudinal end portion of the vehicle body opposite an end portion in which a baggage compartment is provided.

DESCRIPTION OF THE PREFERRED EMBODIMENT

Figure 1:
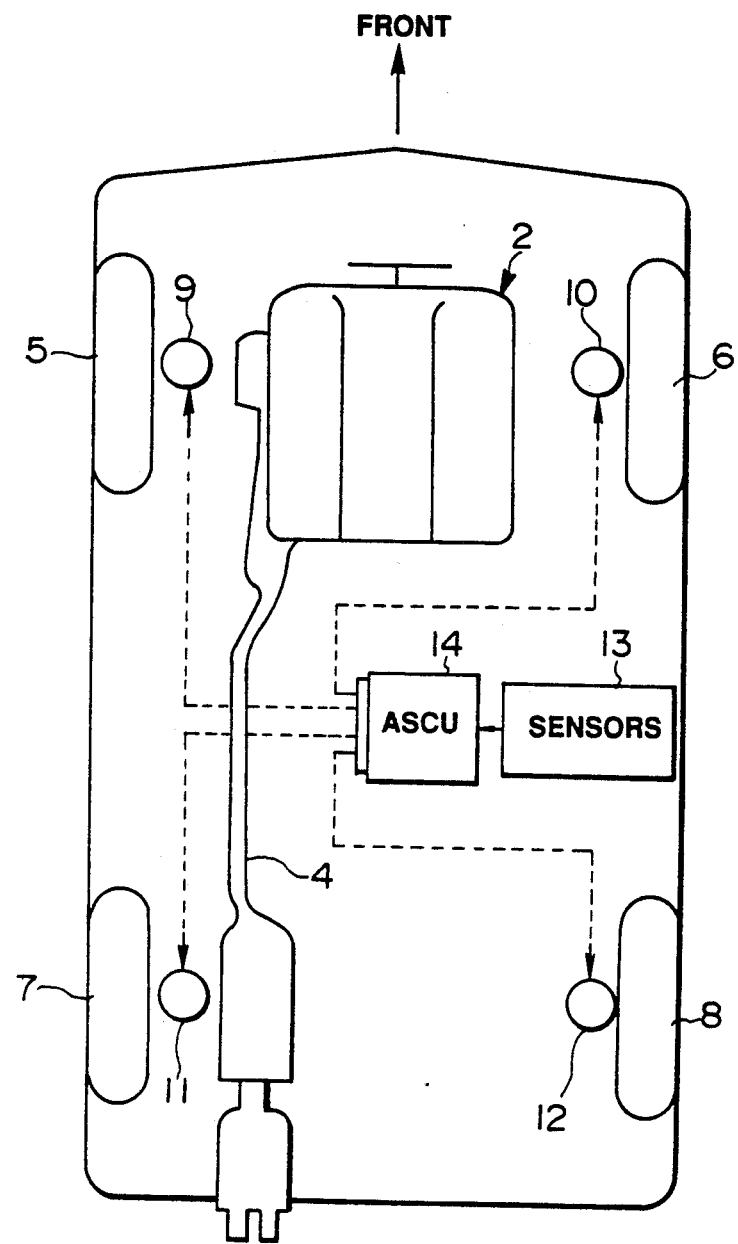
FIG. 1 is a schematic view which shows a vehicle incorporating a height control system according to the present invention.

Referring now to the drawings, particularly to FIG. 1, there is shown an automotive vehicle which includes generally an engine 2, an exhaust system 4, and a height control system according to the present invention. The height control system includes four suspension units 9, 10, 11, and 12 disposed between a vehicle body and suspension members rotatably supporting wheels 5, 6, 7, and 8 respectively, an air suspension control unit 14, and a plurality of sensors 13 as described hereinafter in detail. The height control system serves to adjust height levels between the vehicle body and front-left, front-right, rear-left, and rear-right wheels 5, 6, 7 and 8, independently of each other.

Figure 2:
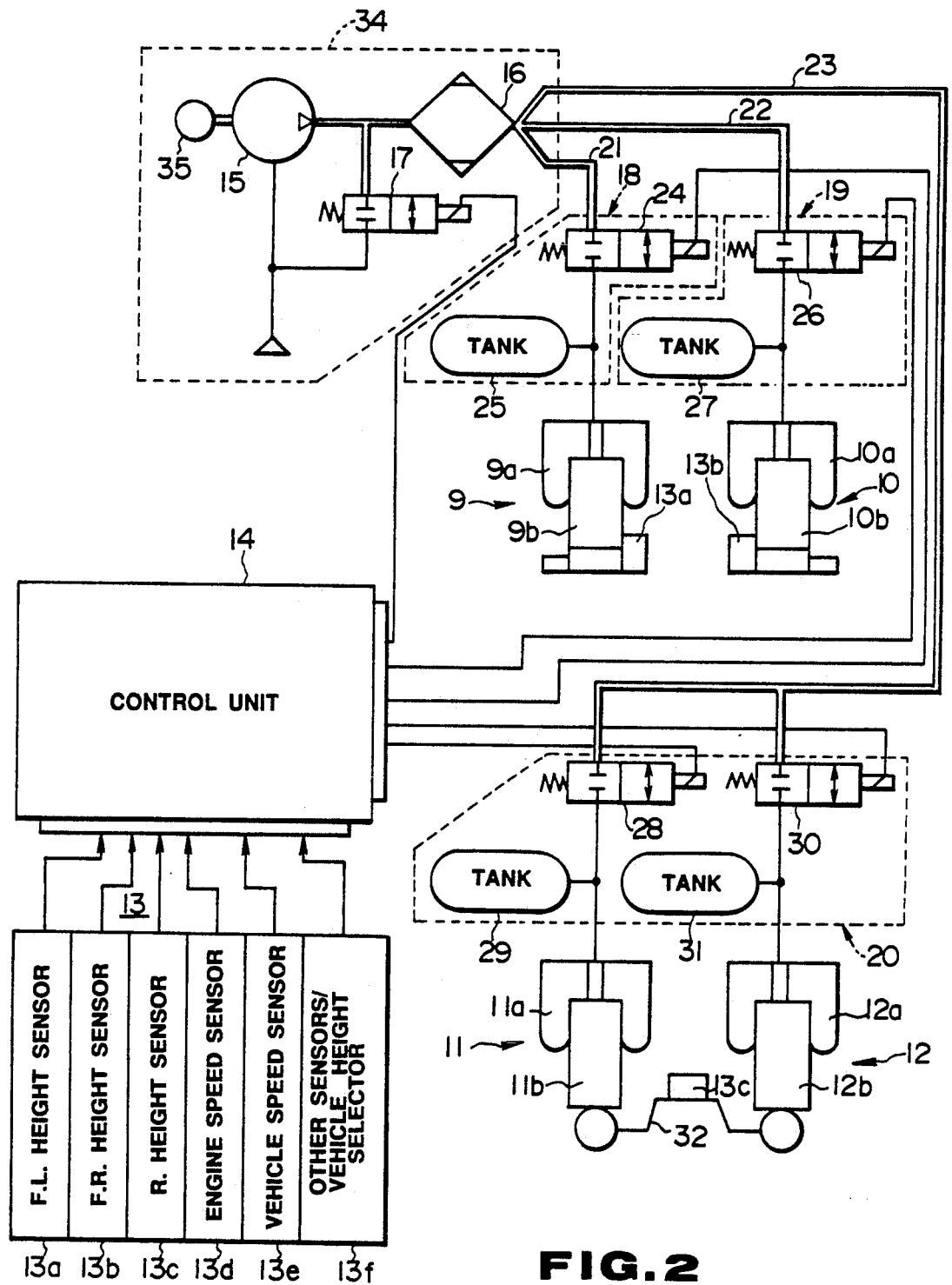
FIG. 2 is a schematic view which shows a height control system of the present invention.

Referring to FIG. 2, the height control system is shown. The height control system, as described above, includes suspension units 9, 10, 11, and 12. These suspension units include fluid chambers 9a, 10a, 11a, and 12a such as air chambers filled with compressed air and shock absorbers 9b, 10b, 11b, and 12b functioning as actuators. The height control system is operable to regulate pressure or an amount of compressed air in the air chambers 9a, 10a, 11a, and 12a to control vehicle height levels at the wheels 5, 6, 7, and 8 separately. The height control system further includes a fluid power source such as an air source 34 which comprises a compressor 15 for supplying compressed air required for increasing vehicle height, a motor 35 for driving the compressor 15, a dryer 16 for dehydrating the air in a circuit line, and an exhaust valve 17 openable for draining the compressed air in the air chambers 9a, 10a, 11a, and 11a to the outside lowering the vehicle height toward a standard height value. The dryer 16 is connected to a front-left wheel air circuit 18, a front-right wheel air circuit 19, and a rear wheel air circuit 20 through air pipes 21, 22, and 23 respectively. The front-left wheel air circuit 18 includes a front-left suspension valve 24, such as a pressure control valve or a flow control valve, operable in vehicle height adjustment and a front-left sub-tank 25. Likewise, the front-right wheel air circuit 19 includes a front-right suspension valve 26 and a front-left sub-tank 27. The rear-wheel air circuit 20 also includes rear-left and rear-right suspension valves 28 and 30 and rear-left and rear-right subtanks 29 and 31.

The height control system further includes front-left and front-right height sensors 13a and 13b, a rear height sensor 13c, an engine speed sensor 13d for detecting speed of the engine 2, a vehicle speed sensor 13e for detecting vehicle speed, and other sensors and a selector 13f such as a steering angle sensor, a brake sensor (i.e., a parking brake switch), and a vehicle height level selector.

The front-left and front-right height sensors 13a and 13b are installed on the front suspension members respectively for detecting vehicle height levels at the front-left and front-right wheels 5 and 6. The rear height sensor 13c is mounted on a rear stabilizer 32 for detecting a height level of a rear portion of the vehicle body. The sensors 13a to 13f provide signals each indicating a detected parameter to the air suspension control unit 14.

As mentioned above, the suspension units (9-12) utilize air suspension, however, the suspension units may alternatively be provided with a hydraulic suspension including a hydraulic cylinder.

The air suspension control unit 14 is responsive to the signals from the sensors 13a to 13f, the switch, and the selector 13f to provide leveling control signals to the valves 17, 24, 26, 28, and 30 respectively to effect height adjustment so that vehicle height is leveled at a predetermined height selected by the vehicle height level selector 13f. The control unit 14 is further operable to determine whether the vehicle body is jacked up or not during parking based on a height variation at the front-left and/or front-right wheels 5 and 6 and then stops vehicle height down adjustment when the vehicle body is jacked up for preventing the vehicle height from being decreased greatly when the vehicle body is subsequently jacked down.

Figure 3:
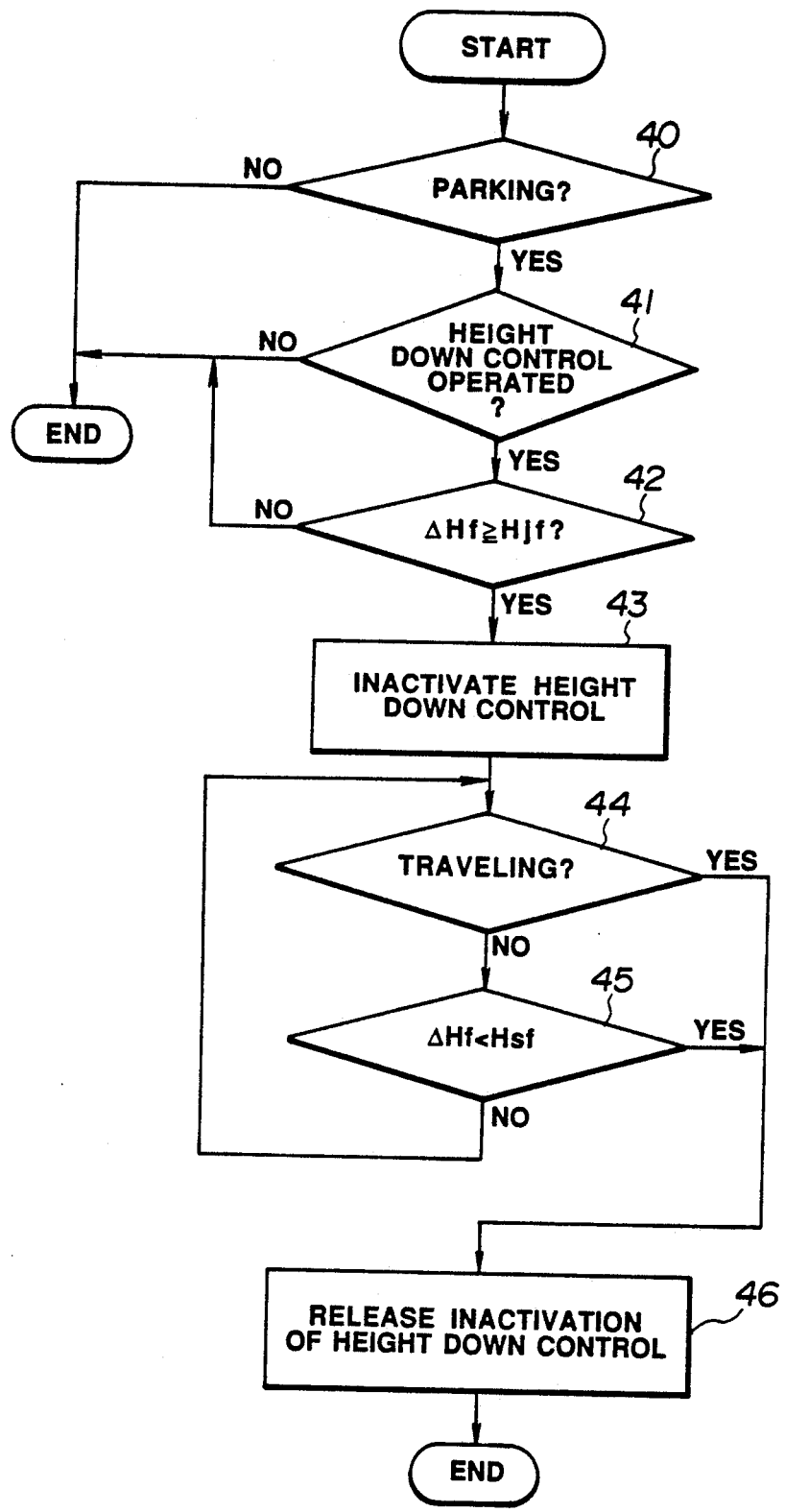
FIG. 3 is a flowchart which shows logical steps performed by a suspension control unit of a height control system.

Referring to FIG. 3, there is shown a flowchart of a program or sequence of logical steps performed by the air suspension control unit 14.

After entering the program, the routine proceeds to step 40 wherein it is determined whether the vehicle is parked or not based on the signals from the vehicle speed sensor 13e and/or the parking brake switch 13f. If a YES answer is obtained, the routine then proceeds to step 41 wherein it is determined whether vehicle height down control is now active or not based on a signal indicative of conclusion in the air suspension control unit 14 that the vehicle height is necessary to be decreased and/or leveling control signals output from the air suspension control unit 14 which command the drain valve 17 and the front-left and front-right suspension valves 24 and 26 to be opened. If a YES answer is obtained, the routine then proceeds to step 42 wherein it is determined whether a vehicle height variation $\Delta Hf$ is greater than or equal to a preselected threshold value Hjf for determining whether jack-up operation is effected or not. Here, the vehicle height variation $\Delta Hf$ is defined by a difference between front height levels Hf detected by the front-left and the front-right height sensors 13a and 13b and a predetermined standard vehicle height value DB (i.e., $\Delta Hf = Hf - DB$).

If a YES answer is obtained in step 42 concluding that the vehicle body is now being jacked up, the routine then proceeds to step 43 wherein the air suspension control unit 14 restricts, or inactivates the vehicle height down control.

It will be noted that the above steps 40 to 42 are initial conditions for jack-up control effected when the vehicle body is jacked up. Steps 44 and 45 as discussed below are conditions for releasing the jack-up control to return to usual height control.

After step 43, the routine proceeds to step 44 wherein it is determined whether the vehicle is now traveling or not based on the signal from the vehicle speed sensor 13e. If a YES answer is obtained concluding that the vehicle begins to start, the routine then proceeds to step 46 wherein the deactivation of the vehicle height down control is released so that the usual height control is activated wherein the vehicle body is leveled at the standard height value.

If a NO answer is obtained in step 44, the routine then proceeds to step 45 wherein it is determined whether the vehicle height variation $\Delta Hf$ is lower than a preselected threshold value Hsf ($\Delta Hf < Hsf$) which is smaller than the value Hjf for releasing the deactivation of the vehicle height down control. The value Hsf may be equal to the value Hjf. Alternatively, if a YES answer is obtained in step 45, the routine then proceeds to step 46. Afterward, the program terminates.

Figure 4:
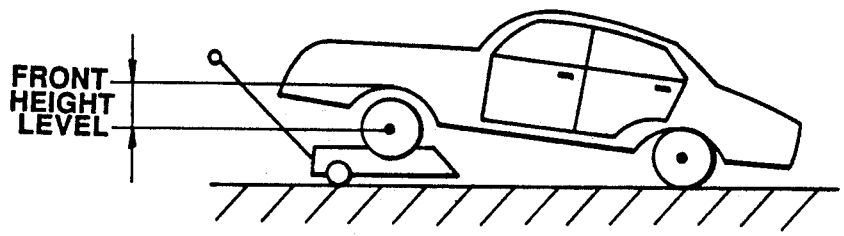
FIGS. 4, 5, and 6 are explanatory views which show variation in a height level due to passengers getting on or out of a vehicle and/or baggage loaded into or unloaded from a baggage compartment.

In operation, when a front portion of a vehicle body is jacked up as shown in FIG. 4, the weight of the vehicle body acting on the front wheels 5 and 6 is decreased gradually, causing front coil springs (not shown), disposed between the vehicle body and the suspension members rotatably supporting the front wheels, to begin to extend. Thus, intervals between the front-left and right wheels and the vehicle body, i.e., front vehicle heights are increased. The front height sensors 13a and 13b then provide signals indicative of front height levels greater than the standard height value DB. The air suspension control unit 14 is responsive to the front height level change to provide leveling control signals to the drain valve 17 and the front-left and front-right suspension valves 24 and 26 to open these, draining compressed air in the air chambers 9a and 10a for lowering the front height at a level orientation.

When the front portion of the vehicle body is further jacked up and the front height variation $\Delta Hf$, defined by a difference between at least one of the front-left and right height levels Hf monitored by the front height sensors 13a and 13b and the standard height value DB, becomes greater than or equal to the jack-up determination threshold value Hjf, the air suspension control unit 14 stops the vehicle height down control as already mentioned in step 43, preventing compressed air in the air chambers 9a and 10a from being discharged completely.

Therefore, when the vehicle body is jacked down subsequently, a front height level is not reduced extremely, preventing a bottom of the vehicle body from contacting with protrusions of a road surface.

Figure 5:
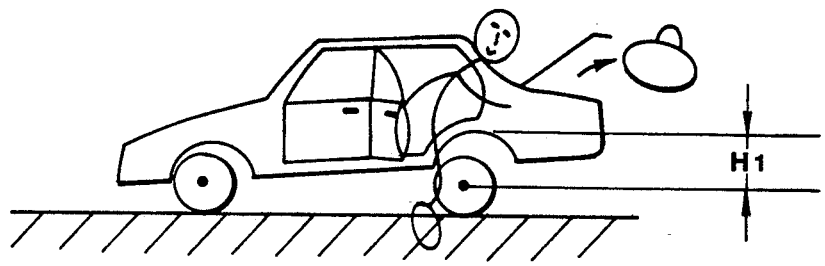
Figure 6:
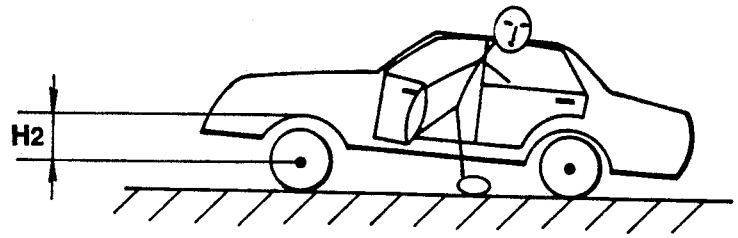

The reasons for determining the jack-up operation based on only a front height level are as follows. Usually, a variation in a height level $H_1$ at a rear portion of the vehicle body is, as shown in FIG. 5, relatively greater due to baggage loaded into or unloaded from a trunk as well as passengers getting on and out of rear passenger seats. In contrast to this, a variation in a height level $H_2$ at a front portion of the vehicle body is, as shown in FIG. 6, relatively smaller because generally a passenger and a driver only get in and out of the front passenger seats, along with usually small hand baggage. Thus, determination of the jack-up operation based on a rear height level requires a value of a jack-up criterion, or the threshold value Hjf to be set to a value greater than that in determination of the jack-up operation based on a front height level for preventing the vehicle body from being considered to be jacked up although not lifted up with a jack. As a result, the determination of jack-up operation according to rear height level must be delayed, requiring more time and so according to the present invention, jack up determination is carried out according to front height level.

Additionally, in a conventional vehicle having an engine mounted in a front engine compartment, wheel loads acting on front wheels are usually greater than those acting on rear wheels. Front suspensions thus include coil springs having a spring constant greater than that of rear suspensions. It will be noted that variation in front height level becomes greater than that in rear height level even when the same load variation occurs at front and rear portions due to baggage loaded or unloaded and/or passengers getting into or out of the vehicle. Therefore, determination of jack-up operation based on the variation in the front height level is made quickly as compared with determination based on the variation in the rear height level.

Of course, in a case of a vehicle with a front baggage compartment and a rear engine compartment, it is preferable to determine jack-up operation based on a rear height level. Additionally, determination of jack-up operation may be made separately based on front and rear height levels. In this case, as mentioned above, setting jack-up critical values (i.e., the threshold value Hjf) to different values is necessary. For example, it is preferable to provide the jack-up criteria for determination based on the rear height level greater than that for determination based on the front height level.

What is claimed is:

1. A height control system for a vehicle comprising:
   suspension units including actuators for adjusting height levels between a vehicle body and wheels respectively;
   height sensor means for detecting a height level of the vehicle body at at least one of the wheels to provide a signal indicative thereof;
   a vehicle parking state determining means for determining a vehicle parking state to provide a signal indicative thereof; and
   height control means including means for receiving the signal from said height sensor means indicating a height level shifted from a preselected standard height value and for providing leveling control signals to the actuators so that the vehicle body is leveled at the preselected standard height value, means for receiving the signal from the vehicle parking state determining means, and means for deactivating vehicle height down leveling control in the vehicle parking state after said vehicle height down leveling control has been activated based upon a vehicle height variation above the preselected standard height value of at least one of the wheels becoming greater than a preselected threshold value.

2. A system as set forth in claim 1, wherein said height control means reactivates the leveling control when the height level detected by said height sensor means becomes smaller than a given value which is smaller than said preselected threshold value.

3. A system as set forth in claim 1, wherein said height sensor means detects the height level of the vehicle body at a wheel arranged at a longitudinal end portion of the vehicle body opposite an end portion in which a baggage compartment is provided.

* * * * *